(No Model.)

F. W. H. WEISHAUPT.
MACHINE FOR THE MANUFACTURE OF BRIDLES FOR PAINT BRUSHES.

No. 487,309. Patented Dec. 6, 1892.

Fig. 1.

(No Model.) 9 Sheets—Sheet 2.

F. W. H. WEISHAUPT.
MACHINE FOR THE MANUFACTURE OF BRIDLES FOR PAINT BRUSHES.

No. 487,309. Patented Dec. 6, 1892.

Fig. 2.

Witnesses:
Edwin Greer.
James McKigan.

Inventor:
Frederick W. H. Weishaupt,
by Frank M. Burnham,
his Attorney.

THE NORRIS PETERS CO., PHOTO-LITHO., WASHINGTON, D. C.

Fig. 5.

(No Model.) 9 Sheets—Sheet 5.

F. W. H. WEISHAUPT.
MACHINE FOR THE MANUFACTURE OF BRIDLES FOR PAINT BRUSHES.

No. 487,309. Patented Dec. 6, 1892.

(No Model.) 9 Sheets—Sheet 7.
F. W. H. WEISHAUPT.
MACHINE FOR THE MANUFACTURE OF BRIDLES FOR PAINT BRUSHES.

No. 487,309. Patented Dec. 6, 1892.

Witnesses
Edwin Green.
James McKigan

Inventor
Frederick W. H. Weishaupt,
by Frank M. Burnham,
his Attorney.

(No Model.) 9 Sheets—Sheet 8.

F. W. H. WEISHAUPT.
MACHINE FOR THE MANUFACTURE OF BRIDLES FOR PAINT BRUSHES.

No. 487,309. Patented Dec. 6, 1892.

Witnesses:
Edwin Green.
James McKigan

Inventor:
Frederick W. H. Weishaupt
by Frank M. Burnham,
his Attorney.

(No Model.) 9 Sheets—Sheet 9.
F. W. H. WEISHAUPT.
MACHINE FOR THE MANUFACTURE OF BRIDLES FOR PAINT BRUSHES.

No. 487,309. Patented Dec. 6, 1892.

Witnesses:
Edwin Greer.
James McKigan

Inventor:
Frederick W. H. Weishaupt,
by Frank M. Burnham,
his Attorney.

United States Patent Office.

FREDERICK W. H. WEISHAUPT, OF WASHINGTON, DISTRICT OF COLUMBIA.

MACHINE FOR THE MANUFACTURE OF BRIDLES FOR PAINT-BRUSHES.

SPECIFICATION forming part of Letters Patent No. 487,309, dated December 6, 1892.

Application filed August 8, 1892. Serial No. 442,504. (No model.)

*To all whom it may concern:*

Be it known that I, FREDERICK WILLIAM HENRY WEISHAUPT, a citizen of the United States, residing at Washington, in the District of Columbia, have invented certain new and useful Improvements in Machines for the Manufacture of Bridles for Paint-Brushes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machines designed for use in the manufacture and production of bridles for paint-brushes, and is especially designed for the manufacture and production of the bridle for paint-brushes patented to me February 9, 1892, Letters Patent No. 468,405, which consists in the combination, with a brush-head, a handle for the brush, and bristles seated in said brush-head and secured therein, of an open or lapping metallic binding-sleeve provided with aligned holes in its lapped portions and with its lower edge turned inward and upward, adjusting-pins connecting said overlapping portions and engaging and compressing the brush-body by its upturned lower edge, and a clamp seated in the top of the brush-head and engaging the lapped edges of the binding-sleeve; and the present invention consists in the construction and novel combination of the parts of the same, as hereinafter fully described, and particularly pointed out in the claims.

In the accompanying drawings, Fig. 6 is an end elevation, the change in the working position of some of the lower parts of the machine being shown in dotted lines. Fig. 6$^a$ is a detail view, partly in section, of a portion of one of the hollow uprights, showing the vertical slides H' $h'$, the rods connecting them with the treadles, and the springs in the grooves whereby the slides are returned to their normal positions when the treadles have been released from downward pressure.

Figure 1:
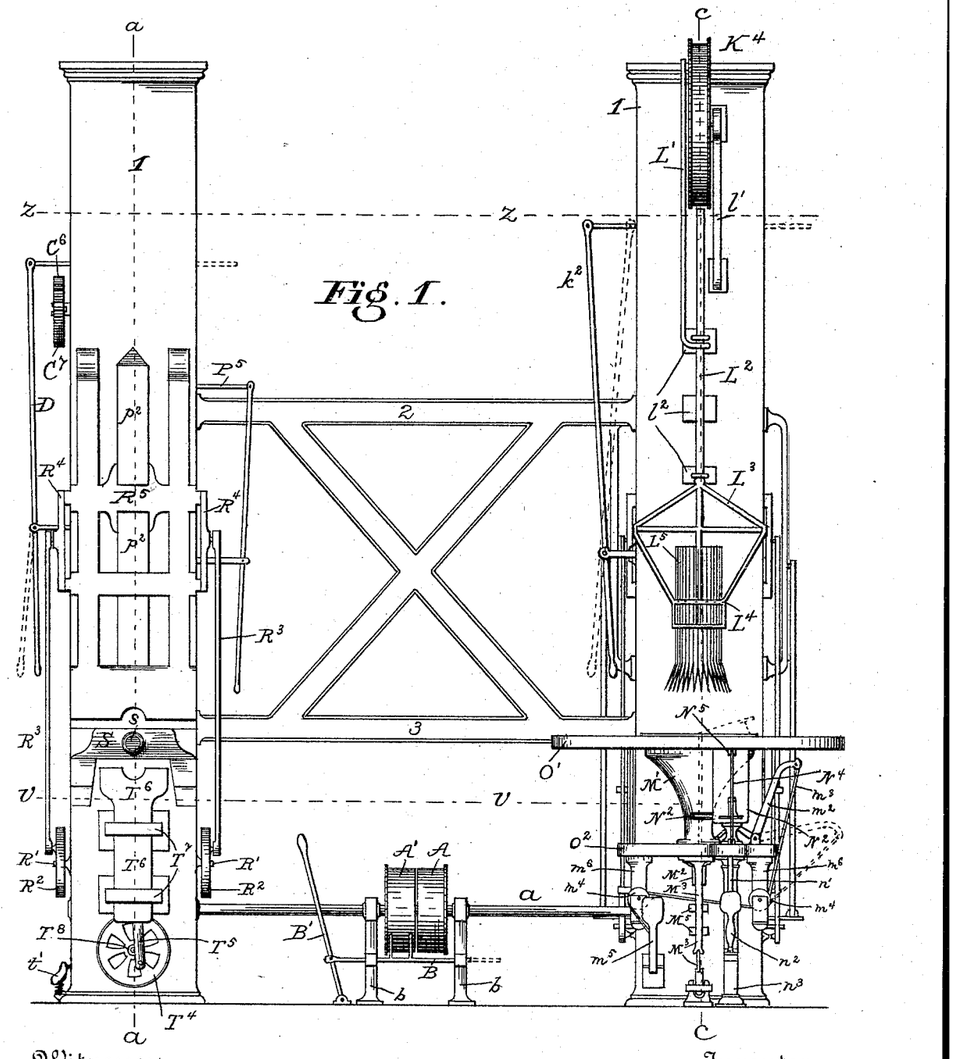
Figure 1 is a front elevation of my improved machine for the manufacture or production of metallic bridles for paint-brushes, especially the bridle hereinbefore referred to and described in Letters Patent No. 468,405, of February 9, 1892.
Figure 2:
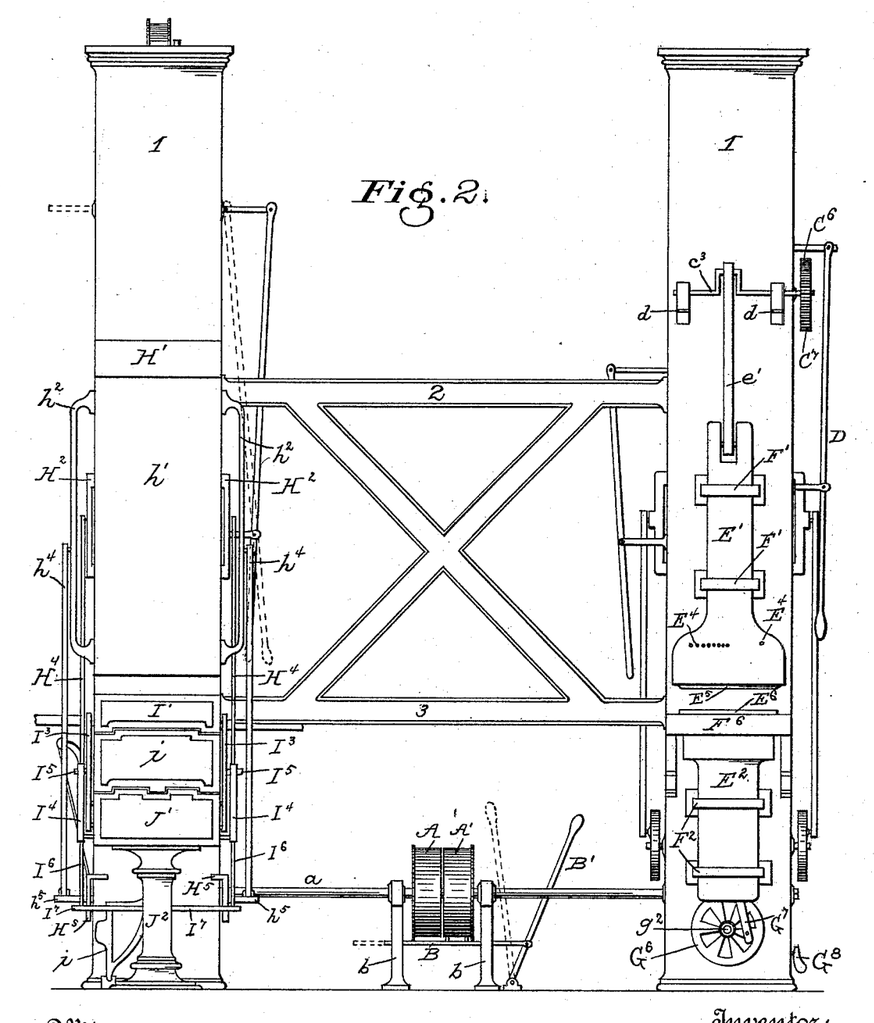
Fig. 2 is a rear elevation of my improved brush-bridle-making machine.
Figures 3, 4:
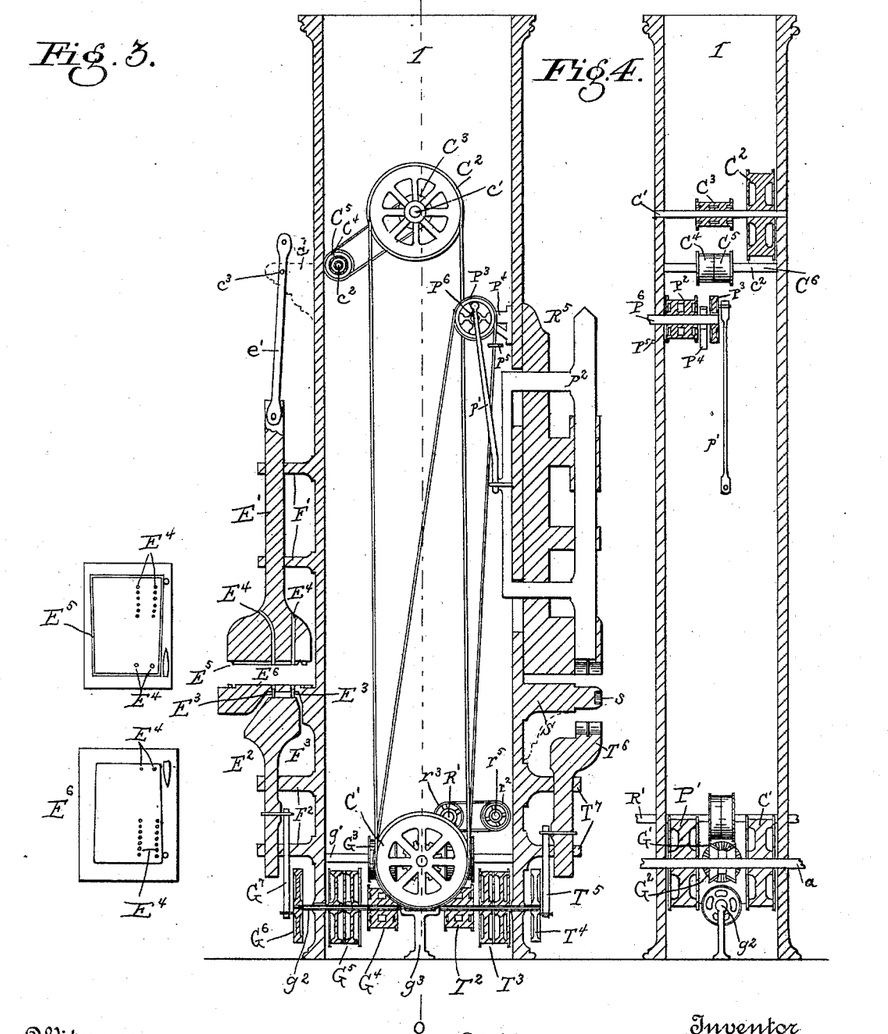
Fig. 3 is a vertical sectional view, partly in elevation, taken on the line $a\,a$ of Fig. 1.
Fig. 4 is a vertical sectional view, parts being shown in elevation, taken on the line $o\,o$ of Fig. 3.
Figure 5:
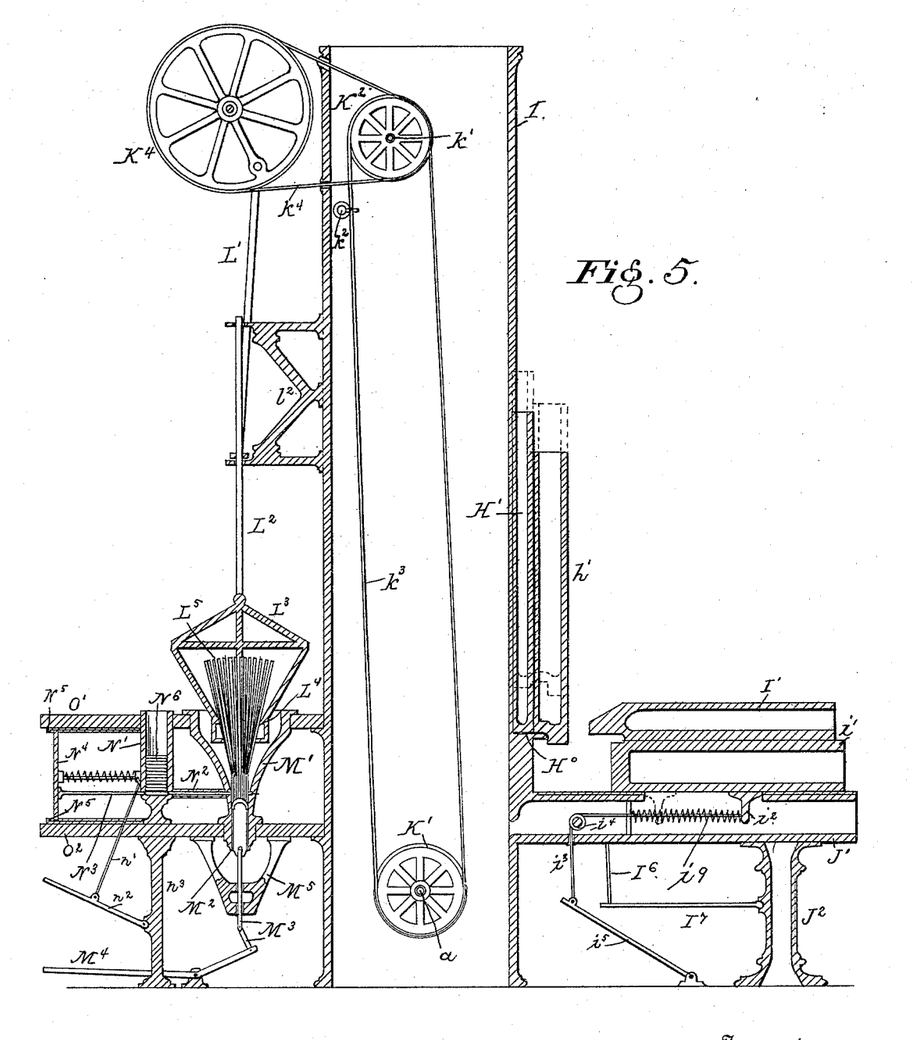
Fig. 5 is a vertical sectional view, parts being shown in elevation, taken on the line $c\,c$ in Fig. 1.
Figures 6, 6A:
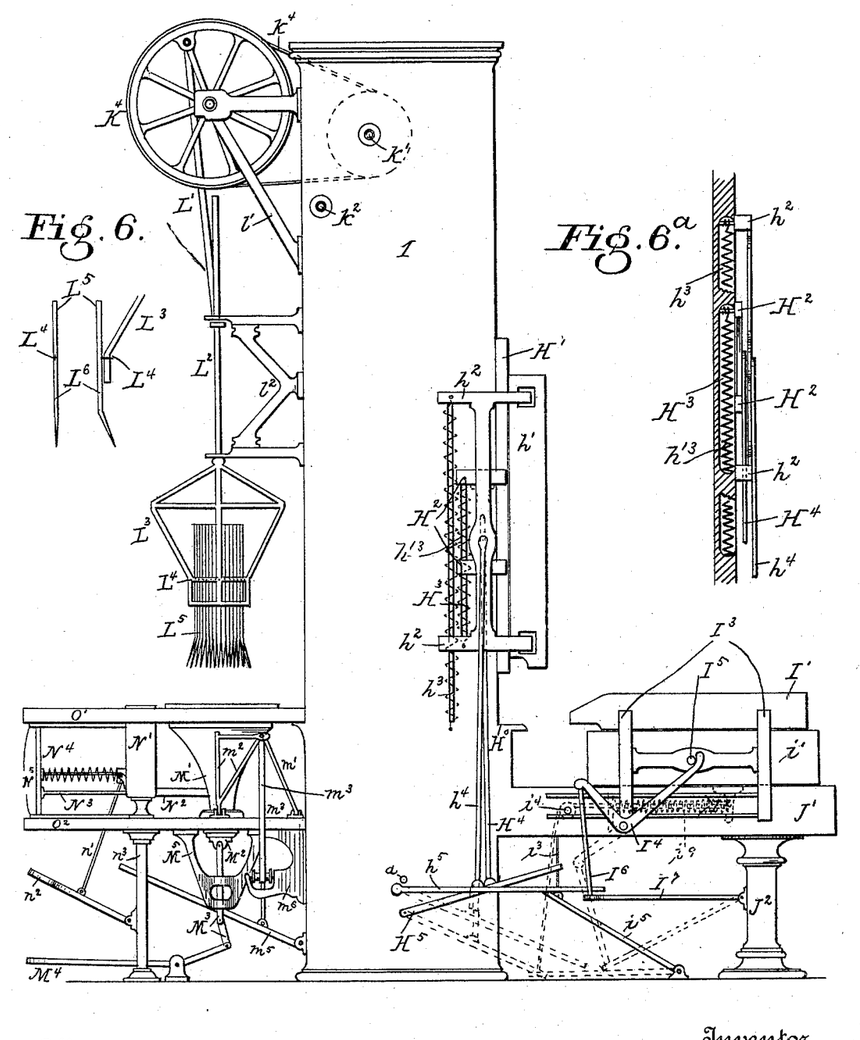
Figure 7:
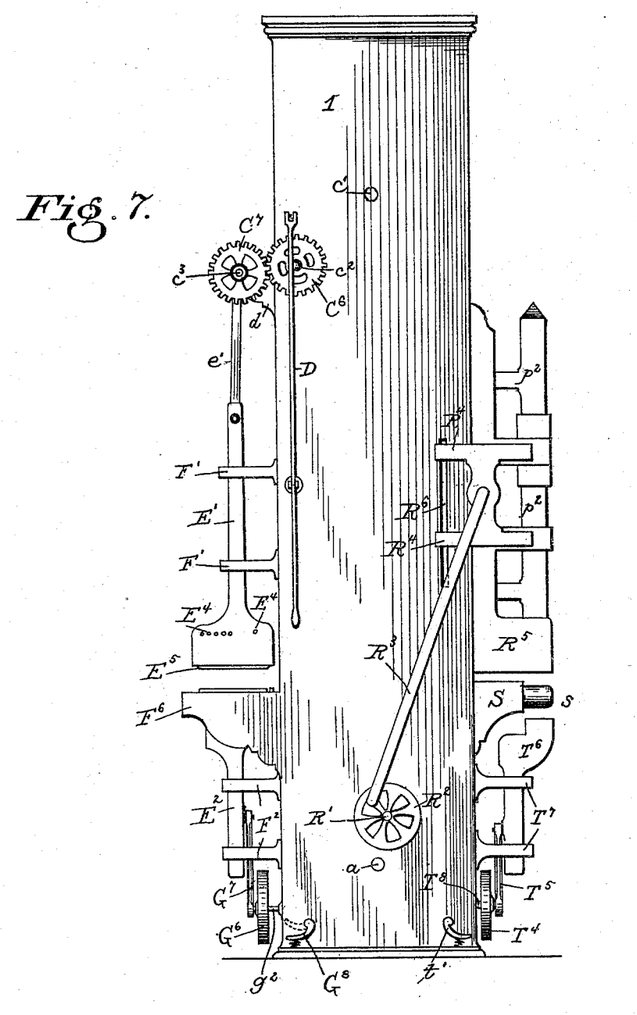
Fig. 7 is an end elevation taken from the right side of the machine as illustrated in Fig. 2.
Figure 8:
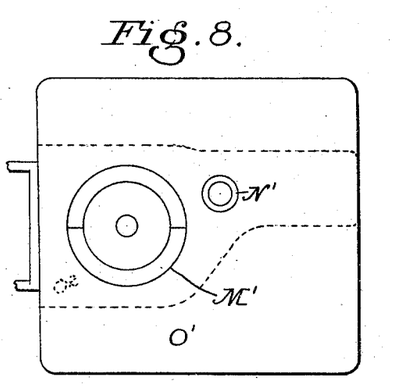
Fig. 8 is a detail plan view shown partly in dotted lines.
Figure 9:
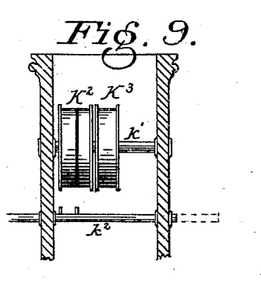
Fig. 9 is a sectional detail view, partly in elevation, of a loose and a stationary pulley and their supports.
Figure 10:
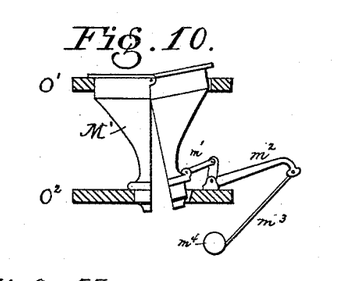
Fig. 10 is a detail view, partly in section, of the funnel-shaped reservoir and its immediate connections.
Figure 11:
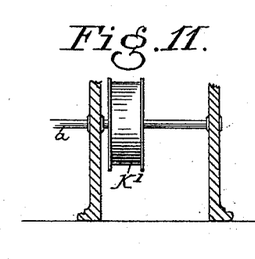
Fig. 11 is a detail view of one of the pulleys K' and its supports.
Figure 12:
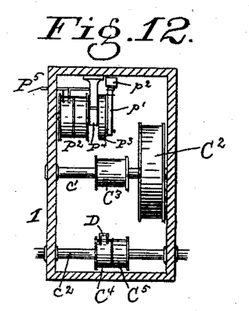
Figs. 12 and 13 are horizontal sectional views on the line $z\,z$ in Fig. 1 viewed from below upwardly.
Figure 13:
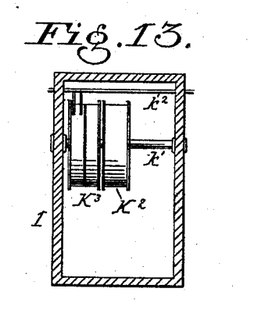
Figure 14:
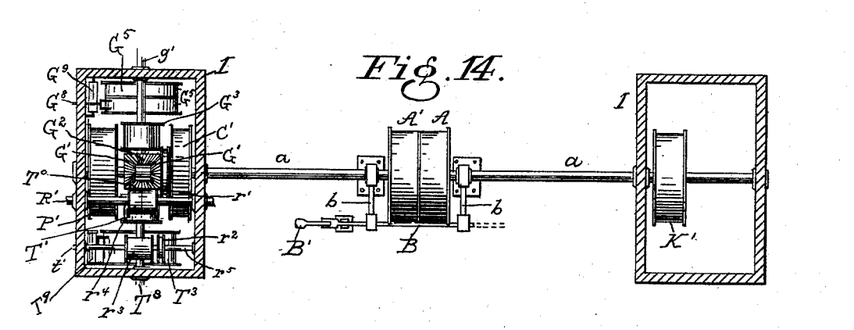
Fig. 14 is a horizontal sectional view on the line $v\,v$ in Fig. 1 viewed from above downwardly.
Figure 15:
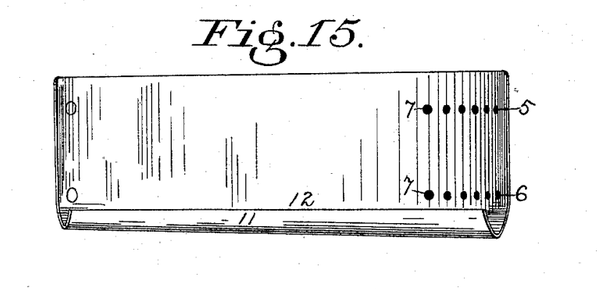
Fig. 15 is a face view of the formed blank from which the metallic binding-sleeve is made.
Figure 16:
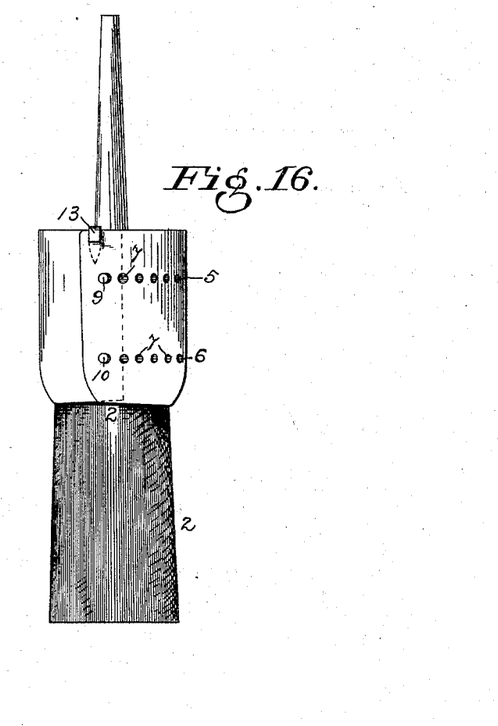
Fig. 16 is a side elevation of a paint-brush and its metallic bridle, hereinbefore referred to, and Fig. 17 is a top plan view of said metallic brush-bridle.
Figure 17:
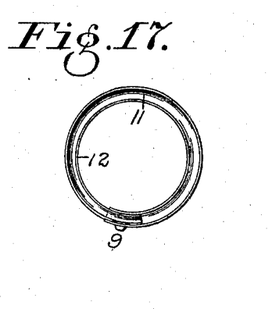

Referring by letters and reference-numerals to the accompanying drawings, 1 designates the hollow uprights of the main frame, which supports the operative or working mechanism, and 2 and 3 the parallel horizontal connecting-bars, which assist in supporting and strengthening the hollow uprights of the main frame, said parallel horizontal bars being braced and connected intermediate of their connections with the hollow uprights by integral intersecting brace-bars, which serve to give great stability to the supporting structure.

$a$ indicates the main power-shaft, by which power is transmitted to the machine and then by various wheels and pulleys, hereinafter described, to the point or points at which it is intended to be utilized in the manufacture and production of the metallic brush-bridle hereinbefore referred to.

A and A' designate two pulleys—one fixed and the other loose—on the main power-shaft $a$ and designed to permit power to be transmitted to the power-shaft $a$ from any suitable outside source of power. The power-shaft $a$ is supported in short uprights $b\ b$ and is held firmly in bearings in the upper ends of said uprights.

B is a slide, and B' a lever connected thereto, and is designed for use in sliding a leather belt from the loose pulley A to the fixed pulley A' or from the stationary pulley to the loose pulley, as occasion may require.

C' is a large pulley, which is keyed or otherwise fixed on shaft $a$ and transmits power through a leather belt to a large pulley $C^2$, secured to the shaft $c'$.

$C^3$ is another pulley, which is also secured to the shaft $c'$ and which transmits power through a leather belt to two pulleys $C^4\ C^5$, the pulley $C^4$ being stationary or fixed and the pulley $C^5$ being loose on a shaft $c^2$, upon which a cog-wheel $C^6$ is also secured and fixed and connects with a similar cog-wheel $C^7$, fastened to an eccentric shaft $c^3$, which is held firmly in place by two brackets $d$.

D is a slide and lever designed for sliding or shifting the leather belt which connects the pulley $C^3$ to the pulleys $C^4$ and $C^5$, thereby sliding the belt from the loose pulleys to the stationary pulleys, and the reverse when necessary.

$e'$ indicates a lever or connecting-rod, which is secured to or connected at its upper end to the eccentric shaft $c^3$ and at its lower end is secured to the plunger E', so that it will require the united action or co-operation of all the parts above mentioned from the pulley C' to the lever or connecting-rod $e'$, inclusive, to operate the plunger E'.

$E^5$ indicates a knife fastened to the bottom of the plunger E', whereby a blank for the paint-brush bridle shown and described in Letters Patent No. 468,405 and also for convenience of reference herein illustrated and described is cut from a piece of suitable sheet metal.

F' indicates the brackets through which the plunger E' slides and at the same time hold said plunger firmly.

$E^4$ indicates the holes through which the waste metal that is produced by the steel pins $E^3$ finds an outlet.

$E^2$ is a plunger, which works in brackets $F^2$ and also in the bed-plate $E^6$. The steel pins $E^3$ are secured to the top of the plunger $E^2$ and slide through the bed-plate $E^6$, thereby producing the aligned holes 7 in the upper and lower rows 5 and 6 for the reception of the upper and lower locking-buttons 9 and 10, which enable the operator to adjust and fit the bridle to brushes of different sizes by aligning any two of the holes that may be required and putting said buttons to place to hold the bridle in position. The lower edge of the expansible and yielding bridle is provided with an integral inwardly-protruding upturned annular flange 11, and at the same time the lower edge 12 is slightly curved inward throughout its entire circumference, so that, while the bristles of the brush-body 2 are firmly held in position, yet paint or oil cannot ascend above the bridle to an extent that will permit the base or head of the brush to rot away within an ordinary use or lifetime of the brush. The integral upturned flange 11 is made sufficiently flexible to yield to the ordinary wear and tear of the brush while in use, and at the same time it exerts sufficient pressure upon the bristles to hold them in position to cause them to wear evenly and uniformly while in use. The clamp 13 is employed in the top of the brush-body and bridle to keep the bridle in place and prevent it from riding up, and at the same time it exerts sufficient pressure upon the bristles to hold them in position to cause them to wear evenly and uniformly while in use.

G' indicates a miter cog-wheel secured to the shaft $a$ and connecting with the miter cog-wheel $G^2$ on the shaft $g'$.

$G^3$ is a pulley-wheel on the shaft $g'$ and is connected by a leather belt to a similar wheel $G^4$, which is secured to a shaft $g^2$.

$G^8$ represents a treadle and slide for shifting the leather belt that connects the pulleys $G^5\ G^5$, the former movable and the latter fixed on the shaft $g^2$. The band-wheel $G^6$ is fastened to the shaft $g^2$.

$G^7$ is an arm which connects the plunger $E^2$ to the band-wheel $G^6$.

$G^9$ is an accompanying pulley to the pulley $G^5$. It should be observed that it will require the combined services or the co-operation of all the parts above mentioned from the miter cog-wheel to the pulley $G^9$ to operate the lower plunger $E^2$.

$g^3$ indicates the bracket or support for the center of the shaft $g^2$.

H' represents a vertical slide.

$H^2$ is a double arm connected to the vertical slide H' on one end and working in two grooves $H^3$ on the other end. The double arm $H^2$ is connected to the treadle $H^5$ by a working arm $H^4$.

$h'$ represents a second vertical slide.

$h^2$ is a double arm connected to the vertical slide $h'$ on one end, working in two grooves $h^3$ on the other end. The double arm is connected with a treadle $h^5$ by a working arm $h^4$.

$J^2$ indicates a column to support a horizontal table or base J'.

$i'$ indicates a horizontal slide resting in grooves on the base J'.

$i^2$ is a bracket, which is secured under the horizontal slide $i'$ on the inside of the base or table J'.

$i^4$ is a stationary pulley inside of the table J'. The bracket $i^3$ is connected with a treadle $i^5$ by a leather belt $i^2$, which runs over the stationary pulley $i^4$.

I' is a horizontal slide resting in grooves on the slide $i'$.

$I^3$ is a double arm connected to the horizontal slide on the upper end and working in grooves $I^2$.

$I^4$ is an angle-arm working against a rolling pulley I⁵, fastened on the double arm I³, and the angle-arm I⁴ is fastened to a treadle I⁷ by a working arm I⁶. Now by treading on the treadle H⁵ the vertical slide H' will be pressed down on a bridle-blank lying on the bed H°. Then by treading on the treadle h⁵, h' will also be pressed down on the bridle-blank on the table H°, thereby forming an angular-shaped piece, thus: ⎤. Then by releasing the treadles H⁵ h⁵ the vertical slide H' and the treadle h' will be forced upward by springs h¹³ in the grooves H³ and h³. The springs h¹³ are arranged within the grooves H³ h³, so as to be contracted or their coils pressed together when the slides are moved down by operating the treadles, and as soon as the pressure on the treadles is removed or withdrawn said springs h¹³ will expand, owing to their resiliency, and return the slides to their initial positions. These springs are secured at their upper ends within their respective grooves by cross-pins, and the lower ends of said springs bear against the end walls of said grooves. Next tread on the treadle I⁷, which will force I' forward onto the ⎤-shaped blank resting on the table H°, and then treading on the treadle i⁵ it will force the horizontal slide i' forward against the blank, thereby substantially shaping the piece this shape ⎦ and producing the flange 11. Then releasing the treadles I⁷ and i⁵ a spring i⁹ in the grooves I² will push the horizontal slide I' back and a spring coiled around the leather belt i³ will force the horizontal slide i' back.

K' indicates a stationary pulley fastened to the main power-shaft a.

k³ represents a leather belt to carry power from the pulley K' to two pulleys K³—one loose and one stationary—which are fastened to an axle or shaft k', on which is also fastened another stationary pulley K², which gives power or motion to a large fly-wheel K⁴ by means of a leather belt k⁴.

k² represents a lever and slide whereby the belt k³ is slid to or from the stationary and loose pulleys K² K³.

L³ represents a frame with a stationary or permanent vertical rod L² attached thereto.

l² represents a bracket with holes in the extending arms for the vertical rod L² to slide in.

l' represents a bracket with an axle attached, so as to hold the large fly-wheel K⁴.

L' is a working arm fastened at the upper end to the fly-wheel K⁴ and at its lower end to permanent vertical rod L².

L⁶ shows a side and face view of an elongated metal tooth L⁵, working inside of and fastened to the frame L³ by a single bolt or pivot L⁴ in each tooth, so as to give a compressed lateral movement (when required) to the nest of teeth L⁵.

M' is a funnel-shaped metal reservoir in two separate vertical parts, but hinged at the top, so as to open and close at the will of the operator. The stationary part or half of the funnel M' is fastened to a wooden table O' on top and resting on a wooden bench or table O² at the bottom, which is supported by an upright n³.

m² represents an angle-arm connected to the funnel-shaped reservoir M' by a short working arm m'.

m⁴ m⁴ represent two pulleys, one on each side of the main column, fastened in the brackets m⁶.

m³ is a leather belt fastened to the angle-arm m² at the upper end and running under pulleys m⁴ on one side and then over pulleys m⁴ on the opposite side and is fastened or secured to the treadle m⁵ at the lower end.

M² represents a metal core or plunger working in the bottom of the reservoir M'.

M³ represents two working arms. The upper or larger arm, working in a bracket M⁵, is fastened at the top to the metal core or plunger M², and small arms M³ being connected are fastened at the bottom to an angle-shaped treadle M⁴.

N' represents a metal cylinder, which is hollow for about four-fifths of its entire length, resting at its base on the bench or table O². The metal cylinder N' is connected to the reservoir M' by an oblong flat metal tube or channel N², with an inclosed slide extending through its entire length and ending in the metal cylinder N' of the funnel-shaped reservoir.

N³ is a metal slide designed to work in the inclosed slide N⁷, thereby pushing the metal rings or collars N⁶ from the metal cylinder N' to the reservoir M'.

N⁴ is a vertical metal support or slide sliding in grooves N⁵, fastened to the wooden table O' and to the wooden bench or table O². The metal slide N³ and the vertical metal support N⁴ are permanently fastened together and act in unison.

n' is a leather belt attached to the vertical metal support or slide N⁴ at the upper end and to a treadle n² at the lower end.

Now, then, when the reservoir M' is locked or closed the machine is ready to start. The first thing to be done is to tread on the treadle n², which pushes the ring or collar N⁶ from the metal cylinder N' through the tube or channel N² and the inclosed slide N⁷ into the reservoir M', and the slide or groove in the reservoir M' is sunk enough to allow the inside of the metal collar N⁶ to be flush with the inside surface of the reservoir M'. Then by releasing the treadle the spiral spring around the leather belt n' forces the vertical slide N⁴ back, which also draws the horizontal slide N³ back, thereby letting the next ring N⁶ drop into place ready to be used on the next bridle. Then take the blank metal with the upturned flange and put it flange end downward—thus —in the funnel M'. Then by holding the treadle M⁴ down until further notice, which pushes the core M³ into place in the reservoir M', next push the lever $k^2$ so that the fly-wheel $K^4$ is put in motion, which with the aid of the frame $L^3$ $L'$ and permanent vertical rod $L^2$ forces the metal teeth $L^5$ down into the reservoir M', where they catch inside of the upturned flange of the blank just placed there and force it down into the vertical or narrowest part of the reservoir M', which gives the rounded form to the blank. The core $M^2$ is to straighten out any defects in the flange which might arise while the blank is being forced into the narrow part of the reservoir M'. When the metal teeth have gone down to their extreme depth in the reservoir M', they will immediately ascend, and the power must be cut off by the lever $k^2$ when the teeth $L^5$ have gained their greatest distance above the table O'. Then release the treadle $M^4$ and immediately tread on the treadle $m^5$, which will open the funnel M' and cause the rounded bridle, with the band $N^6$ encircling it, to drop out.

P' indicates a large power-wheel fastened to the main power-shaft $a$, which transmits power by a leather belt to two pulleys $P^2$—one loose and one stationary—fastened to a shaft $P^6$, which is supported by the outside frame or column and a bracket $P^4$.

$p'$ is a working arm fastened at the upper end to a wheel $P^3$, which is fastened on $P^6$ and $p'$ is fastened at the lower end to a sliding hammer $p^2$.

$P^5$ represents a slide and lever, which slides the belt to and from the stationary and loose pulleys $P^2$.

$r'$ represents a narrow pulley fastened to the main power-shaft $a$. $r^2$ is a similar narrow pulley fastened to shaft $r^5$.

$r'$ and $r^2$ are connected by a leather belt, which transmits power to the other wheel $r^3$, fastened to the shaft $r^5$, which is in turn connected by a leather belt to two pulleys $r^4$—one loose and the other one stationary—fastened to an axle or shaft R'.

$R^2$ is a wheel fastened to the axle or shaft R'.

$R^5$ is a vertical slide.

$R^4$ is a double arm fastened at one end to the vertical slide $R^5$ and working in a groove $R^6$ at the other end.

$R^3$ is a working arm fastened at the upper end to the double arm $R^4$ and at the lower end to the wheel $R^2$.

$T^\circ$ is a miter cog-wheel secured to a shaft $t^\circ$, and $T^\circ$ is geared to work with two similar cog-wheels G', fastened on the main power-shaft $a$.

T' is a small pulley fastened to the shaft $T^8$, and power is carried from the pulley $T^2$, fastened to a shaft $T^8$.

$T^3$ are two large pulleys—one loose and the other stationary—also fastened to the shaft $T^8$.

$T^9$ is a small auxiliary pulley to be connected by a leather belt with the two large pulleys $T^3$.

$T^6$ is a brace working in the brackets $T^7$.

$T^5$ is a working arm fastened at the upper end to the brace $T^6$ and at the lower end to a wheel $T^4$, fastened on the shaft $T^8$.

S is a combination bed and bracket with a stationary hub $s$ fastened permanently at the outer end.

$t'$ is a treadle and lever, which is used to slide the leather belt to and from the loose and stationary pulleys $T^3$, and at the same time slides a leather belt to and from the stationary pulley $r^4$. Now, then, to work this part of the machine all that is to be done is to fasten the rivets, hereinbefore referred to, in the bridle, which is done in the following manner, viz: Taking the bridle, rounded, with collar outside of it to hold it in shape, the first thing to be done is to put one rivet in each hole made for the purpose—viz., two rivets. Then putting the bridle on the hub S, with the rivet-points up, tread on the treadle $t'$, which will move the brace $T^6$ upward and the slide $R^5$ downward at the same time. Then release the treadle as soon as the brace $T^6$ and the slide $R^5$ are pressed firmly against the bridle on the hub S, so that they will act in the nature of a clamp or vise. The grooves shown in the illustration in the bottom of the slide $R^5$ and in the top of $T^6$ are to admit of the collar being retained on the bridle. Then pressing the lever $P^5$ the hammer-face $p^2$ will be worked up and down on the tops of the rivets in the bridle, thereby forming the round heads on the rivets. Then when the heads have been formed on the rivets watch when the hammer $p^2$ has reached its greatest height from the bridle and immediately take the power from it ($p^2$) by drawing the lever $P^5$. Then tread on the treadle $t'$, and when the slide $R^5$ and the brace $T^6$ are at their greatest distance from $s$, which will be simultaneous, then release the treadle $t'$, and then the paint-brush bridle hereinbefore referred to and described in Letters Patent No. 468,405, dated February 9, 1892, will have been completed, with the exception of tempering and nickel-plating or otherwise ornamenting the same.

Now comes the main reason for having the collar $N^6$. The metal, being soft sheet-brass, so as to be worked easily, would require a band to hold the bridle in place after it had assumed its rounded shape, as frequent handling of the bridle before tempering and during the tempering of the same will require it. After the bridle has gone through the four parts of the machine hereinbefore described it is then ready for tempering, which is done in the usual way, and then the bridle can be treated to a nickel bath, which is also performed in the usual manner.

In order to properly mark the patented bridle, a metal marking-stamp can be attached to the bed-plate $E^6$ of the machine, so that while the blank is being cut out and the holes punched the patent-mark can be also applied. With the exception of the tables O' and $O^2$, which are of wood, the entire machine, other than the belts, is of metal.

Having thus fully described my invention, what I claim, and desire to secure by Letters Patent, is—

1. The combination, with the main frame comprising the two hollow uprights connected by parallel bracing-bars and provided near their bases with a horizontal power-shaft $a$, supported in bearings in short centrally-disposed uprights and having a fixed pulley and a loose pulley between said uprights and miter-gears $G'$ $G'$ near one end of the shaft, of a belt-shifter for shifting a driving-belt from one to the other of said pulleys, a countershaft $T^8$, arranged in one of the hollow uprights and at right angles to the shaft $a$, a miter-gearing secured to one end of the shaft $T^8$ and engaging the two similar gear-wheels $G'$ $G'$ upon the main power-shaft $a$, and cog-gears $G'$, connecting with a miter cog-gear $G^2$ on shaft $g'$ and carrying a cog-gear $G^2$, and a pulley-wheel $G^3$, connected by a belt to a wheel $G^4$ on shaft $g^2$, supported parallel to and below shaft $g^2$ in bearings in the hollow upright in which it is located, a treadle and a slide for shifting the belt from the loose to the fixed pulleys $G^5$ $G^5$ on shaft $g^2$, a plunger-cap $E^2$, connected to a band-wheel $G^6$ on the shaft $g^2$, a plunger $E'$, working in the brackets $F'$ and provided with a knife $E^5$, the connecting-rod $e'$, connecting the plunger $E'$ to the eccentric shaft $c^3$, provided with the cog-wheel $C^7$, pulleys $C^4$ $C^5$ on shaft $c^2$, shaft $c'$, provided with large pulley $C^2$ and pulley $C^3$, a belt connecting pulleys $C^4$ $C^5$ to pulley $C^3$ on shaft $c'$, and the large pulley $C'$ on shaft $a$, connected by endless belt to pulley $C^2$ on shaft $c'$, substantially as specified.

2. The combination, with the main frame, comprising the two hollow uprights 1 1, connected by parallel braced connecting-bars and provided near their bases with a horizontal power-shaft $a$, supported in bearings in short centrally-disposed uprights and having a fixed pulley and a loose pulley mounted thereon between said centrally-disposed uprights, of a belt-shifter for shifting a driving-belt from one to the other of said pulleys, a miter-gear secured to the shaft $T^8$ and engaging two similar miter-gears upon the power-shaft $a$, provided, also, with a cog-gear $G'$, connecting with a miter cog-gear $G^2$ on the shaft $g'$, and the plunger $E^2$, sliding in brackets $F^2$ and provided with steel pins $E^3$ in its top face, which slide through openings in the bed-plate $E^6$, and a plunger $E'$, working in guides $F'$ $F'$ and connected at its upper end by a rod $e'$ to an eccentric shaft $c^3$, mounted in bearings $d$ $d$ of its proper upright 1 and provided at its projecting end with a cog-wheel $C^7$, which meshes with a cog-wheel $C^6$ to operate the plunger $E'$ and punch the aligned holes in the sheet-metal blank, substantially as specified.

3. The combination, with the horizontal table $J'$, provided with grooves $I^2$, the horizontal slide $I'$, a double arm $I^3$, secured to the slide, the angle-arm $I^4$, working against a rolling pulley $I^5$, and a working arm $I^6$, connecting the angle-arm to a treadle $I^7$, of a vertical slide $H'$, the bed $H°$, the treadle $H^5$, and springs within the grooves $H^3$ for forcing the vertical slide $H'$ and the treadle $H^5$ upward, substantially as specified.

4. The combination, with the funnel-shaped metal reservoir made in two parts hinged together at the top, the stationary part being secured at its upper end to the table $O'$ and resting on the bench $O^2$, supported on an upright $n^3$, of an angle-arm $m^2$, connected to the hopper by a short working arm $m'$, the leather belt $m^3$, secured at its upper end to the angle-arm $m^2$, running thence over pulley $m^4$, and connected to treadle $m^5$, the metal core or plunger $M^2$, the metal cylinder $N'$, partially hollow and partially solid, resting on table $O^2$ and provided with a slide $N^7$, extending entirely through its length, the slide $N^3$, inclosed in slide $N^7$, the support or slide $N^4$, sliding in groove $N^5$, and the leather belt $n'$, attached to slide $N^4$ at one end and to treadle $n^2$ at the lower end, substantially as specified.

5. The combination, with the hollow upright at the left side of the machine, provided with the bed-plate $E^6$ and the laterally-projecting brackets $F^2$, and the lower vertically-disposed plunger $E^2$, having the face-plate $E^6$, and the pitman-rod $G^7$, connecting the plunger $E^2$ with the wheel $G^6$ on the short shaft $g^2$, of the plunger $E'$, provided with the hammer-face $E^4$ and the face-plate, the pitman $e'$, connecting the plunger $E'$ to the shaft $c^3$ of the gear $C^7$, and the gear-wheel $C^6$, shaft $c^2$, and shifting-lever D, substantially as described.

In testimony whereof I affix my signature in presence of two witnesses.

FREDK. W. H. WEISHAUPT.

Witnesses:
JAS. H. BENDER,
FRANK. R. LIGGETT.